United States Patent
Verdigets et al.

(10) Patent No.: US 6,964,332 B2
(45) Date of Patent: Nov. 15, 2005

(54) MOLDED SPROCKET

(75) Inventors: Christopher J. Verdigets, Ponchatoula, LA (US); Richard J. Sofranec, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 2 days.

(21) Appl. No.: 10/249,818

(22) Filed: May 9, 2003

(65) Prior Publication Data

US 2004/0222072 A1 Nov. 11, 2004

(51) Int. Cl.$^7$ .......................... B65G 23/14; B65G 23/06
(52) U.S. Cl. ............................... 198/834; 198/833
(58) Field of Search .................... 198/833, 834, 198/843; 264/255, 271.1

(56) References Cited

U.S. PATENT DOCUMENTS

| | | | |
|---|---|---|---|
| 3,199,364 A | | 8/1965 | Dew |
| 3,304,795 A | * | 2/1967 | Rouverol .................... 74/411 |
| 3,630,098 A | * | 12/1971 | Oxley ......................... 74/439 |
| 5,469,958 A | * | 11/1995 | Gruettner et al. ........... 198/834 |
| 5,518,109 A | * | 5/1996 | Dailey et al. ............... 198/834 |
| 5,630,500 A | * | 5/1997 | Conrad ....................... 198/833 |
| 6,274,074 B1 | | 8/2001 | Monie ........................ 264/255 |
| 6,696,003 B2 | | 2/2004 | Cediel et al. |
| 2002/0179417 A1 | | 12/2002 | Cediel et al. ............... 198/852 |

FOREIGN PATENT DOCUMENTS

| | | |
|---|---|---|
| EP | 0 303 113 A1 | 2/1989 |
| EP | 0 504 803 A1 | 9/1992 |

OTHER PUBLICATIONS

ISA/EP, International Search Report of PCT/US2004/012557, mailed Nov. 3, 2004.

* cited by examiner

*Primary Examiner*—Gene O. Crawford
(74) *Attorney, Agent, or Firm*—James T. Cronvich

(57) ABSTRACT

A two-material plastic sprocket for modular plastic conveyor belts and an associated method for molding such a sprocket. The sprocket is made of a first plastic material forming the exterior skin and a second plastic material forming the interior core. The sprocket is preferably molded in a co-injection molding process.

13 Claims, 3 Drawing Sheets

MOLDED SPROCKET

BACKGROUND OF INVENTION

The invention relates generally to sprockets used to drive modular plastic conveyor belts and, more particularly, to sprockets molded out of two plastic materials.

Modular plastic conveyor belts are used in a wide range of conveyor applications. Unlike flat belts, which are driven by tensioned rollers or pulleys, modular plastic conveyor belts are driven by sprockets, which positively engage drive structure in the belts. The most common sprockets are molded or machined out of one homogeneous plastic or metal material. The sprocket material is chosen to best match the application. In some instances, the properties of a single material may serve some of the needs of an application well, but may be less than optimum for other needs. For example, in an abrasive environment, a sprocket made entirely of polyurethane, which has good abrasion-resistant properties, may be suggested, but it may be too flexible to drive the belt effectively. As another example, glass-filled materials provide strength and firmness to plastic articles, but are too abrasive in contact with a belt. Thus, there is a need for a sprocket that combines the best properties of various materials to accommodate a wide range of applications.

SUMMARY OF INVENTION

These needs and others are satisfied by a sprocket embodying features of the invention. The sprocket comprises an exterior skin and an integrally molded interior core. The skin is molded of a first plastic material, and the core is molded of a second plastic material. In this way, the sprocket can combine the advantageous properties of both materials to better address a given application.

In another aspect of the invention, a method for molding a sprocket is provided. According to the method, a first plastic material is injected into a cavity defined by inner walls of a sprocket mold to form an exterior skin coating the walls. A second plastic material is injected into the sprocket mold cavity inside the exterior skin. Pressure and heat are applied to the mold to form the sprocket.

BRIEF DESCRIPTION OF DRAWINGS

These and other features, aspects, and advantages of the invention are better understood by reference to the following description, appended claims, and accompanying drawings, in which:

DETAILED DESCRIPTION

Figure 3:
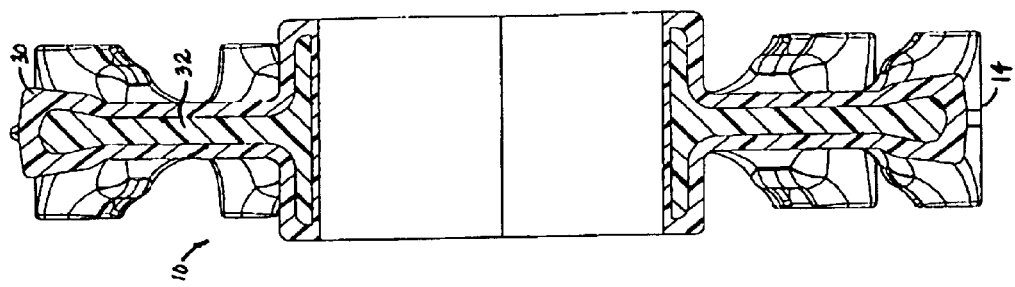
FIG. 3 is a cross section of the sprocket of FIG. 1 taken along lines III—III.
Figure 1:
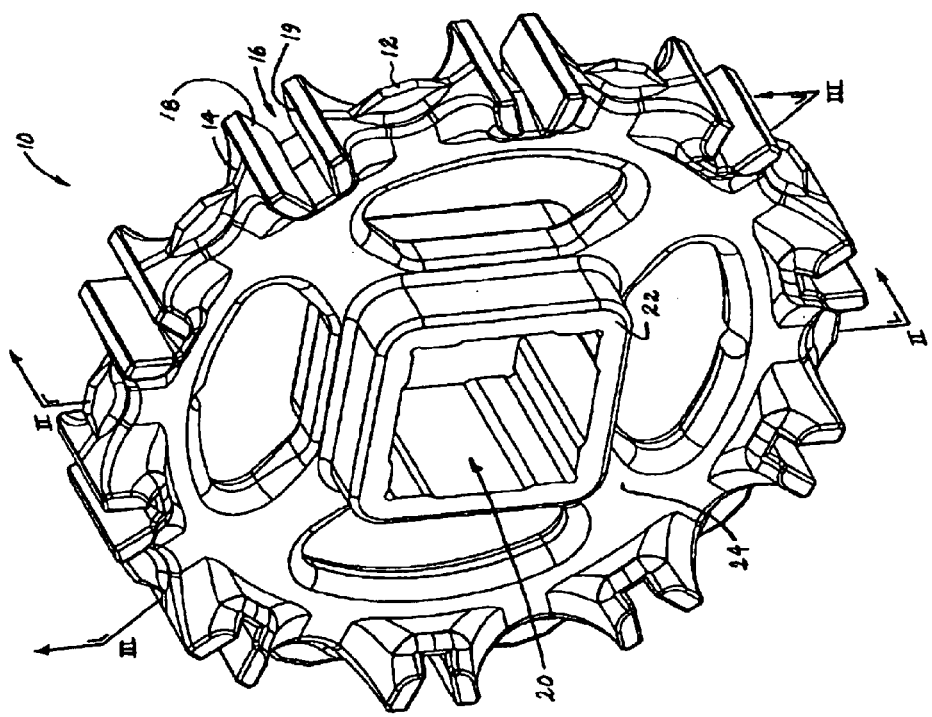
FIG. 1 is an isometric view of a sprocket embodying features of the invention.
Figure 2:
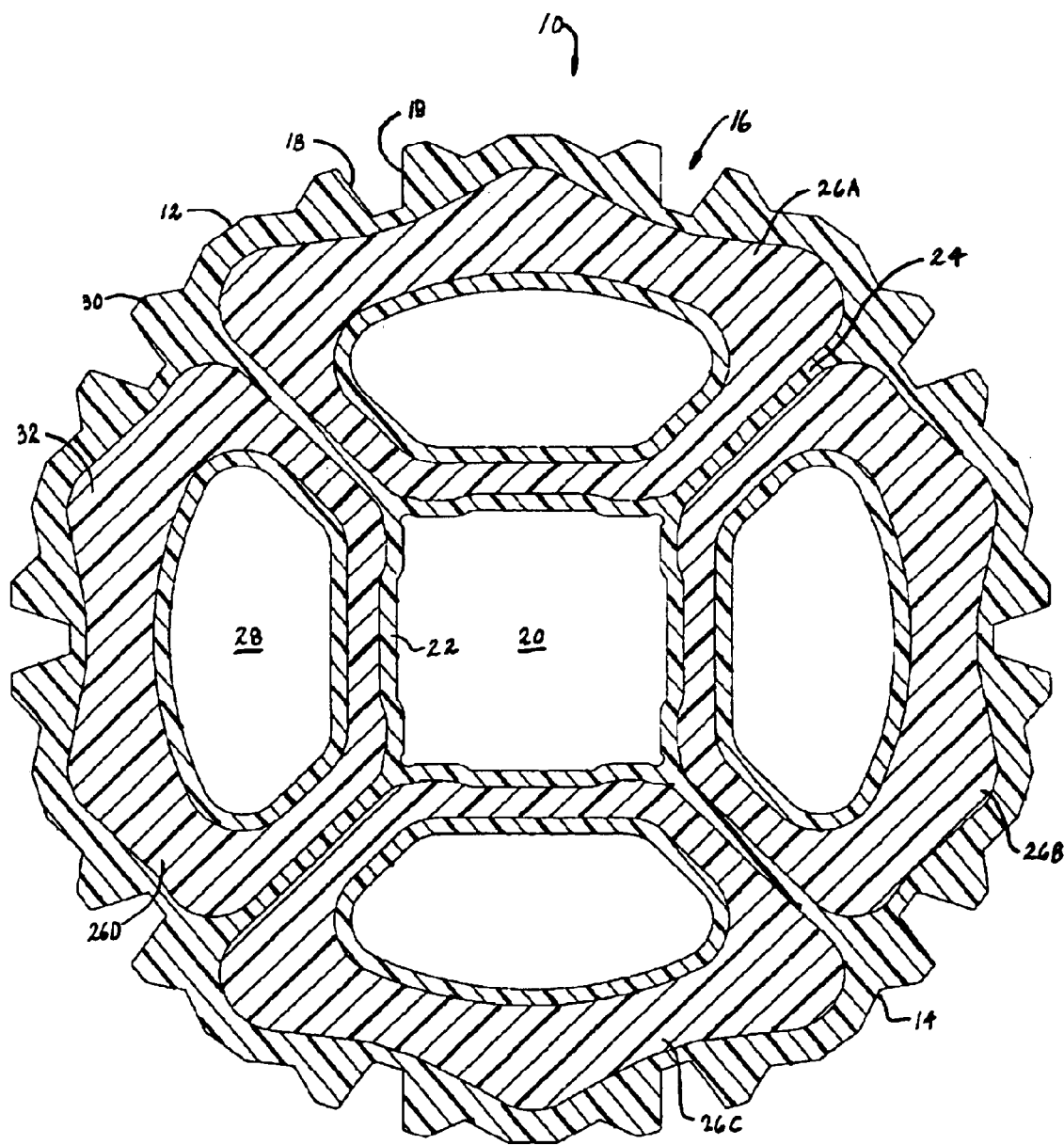
FIG. 2 is a cross section of the sprocket of FIG. 1 taken along lines II—II.
Figure 4E:
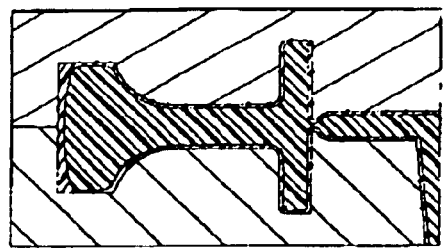
FIGS. 4A–4E are partial cross sectional views illustrating a co-injection molding process for making a sprocket as in FIG. 1.
Figure 4D:
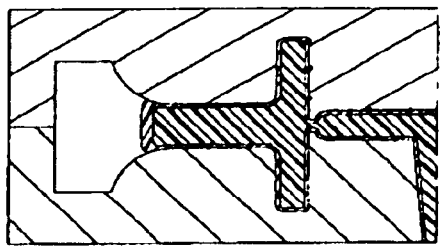
Figure 4C:
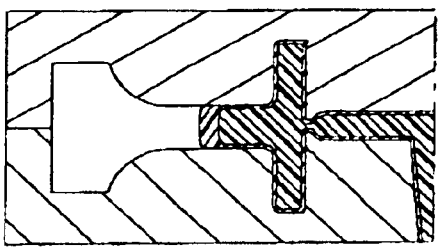
Figure 4B:
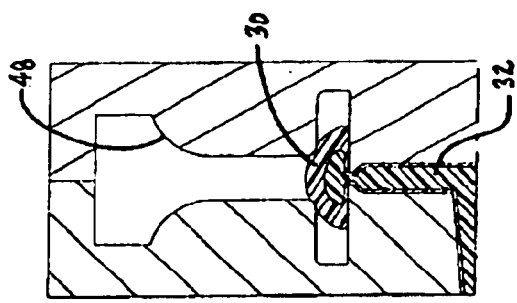
Figure 4A:
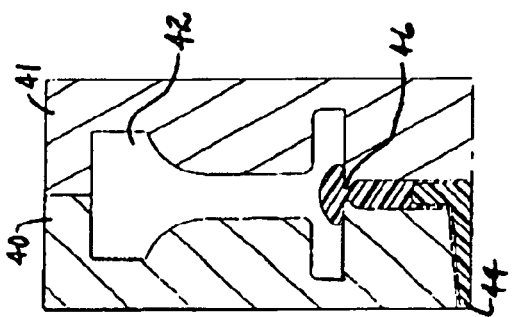

An exemplary sprocket embodying features of the invention is shown in FIGS. 1–3. The shape of the sprocket 10 is the same as that of an INTRALOX Series 800 sprocket manufactured and sold by Intralox, Inc. of Harahan, La., USA. Ten tracking teeth 12 are spaced around the circumferential periphery 14 of the sprocket. Midway between consecutive tracking teeth are grooves 16 with leading and trailing driving surfaces 18, 19 for engaging complementary drive surfaces on a modular plastic conveyor belt. The sprocket also forms a central axial bore 20, shown as generally square to receive a square shaft. A hub 22 around the bore extends axially in the width direction of the sprocket farther than the other parts of the sprocket. Spokes 24 extend from the hub to the outer periphery and divide the sprocket into four regions 26A–D. An opening 28 formed in each region makes the sprocket easy to clean and lighter in weight.

As illustrated in the cross sections of FIGS. 2 and 3, the sprockets, which include an exterior skin 30 and an interior core 32, are made of two materials. The teeth, the peripheral structure, and the exterior skin of the sprocket are made of a first plastic material. The interior core, which includes the interior portion of the four regions, is made of a second plastic material. The materials are preferably integrally molded together into a unitary sprocket in a co-injection molding process. Various combinations of skin and core materials and their properties are listed in Table I.

TABLE I

| Skin Material | Core Material | Properties |
|---|---|---|
| Polyurethane | Glass-filled polyurethane | Abrasion resistant skin with strong, rigid core |
| Polyurethane | Nylon | Abrasion resistant or flexible skin with strong, rigid core |
| Polypropylene | Foamed polypropylene | Neat skin, lightweight core |
| Acetal or nylon | Reground acetal, nylon, polypropylene, polyethylene | Strong sprocket, inexpensive core material |
| Polypropylene | Glass-filled polypropylene | Neat skin, rigid core |
| Polyurethane | Polyurethane/ Acetal blend | Abrasion resistant skin, rigid core |
| Polypropylene | Thermoplastic elastomer (e.g., SANTOPRENE) | Neat skin, flexible core |
| TEFLON | Acetal | Low friction skin, rigid core |
| Antimicrobial additive in material | Neat Plastic | Antimicrobial skin, inexpensive core |
| Electrically conductive additive in material (e.g., in acetal) | Acetal | Static-free skin, rigid core |

As the examples in the table suggest, the co-injection molded sprocket of the invention combines the desirable properties of different materials to make a range of sprockets with properties not achievable with conventional sprockets formed of a single homogeneous material. For example, glass-filed plastics are extremely strong and rigid, but are notoriously abrasive. But, when used to form the core and covered by the skin, the glass-filled plastic does not contact other parts in relative motion. In this way, the sprocket adds the low-abrasion advantages of the chosen skin material to the strength and rigidity of the glass-filled material.

The sprocket is molded as shown in FIGS. 4A–4E. Two mold halves 40, 41, when closed together, form a cavity 42, in which the sprocket is formed. The cavity is bounded and defined by inner walls 48 of the mold halves. Molten thermoplastic material is injected into the cavity from the barrel of an injector (not shown) into a runner 44 and through a gate 46. In a co-injection molding process, two materials are injected through the same runner and gate. As shown in FIG. 4A–4E, the first plastic material 30 forming the skin is injected first. As the first plastic material enters the cavity, it coats the walls 48 of the cavity and the inner surface of the runner. The second plastic material 32 is injected into the runner inside the first plastic material. The injection process continues in sequence as depicted in FIGS. 4A–4E until the cavity is filled with both materials â☐☐the first plastic material forming the exterior skin and the second plastic material forming the interior core. Preferably, the skin is no less than about 0.3 mm thick and generally encapsulates the interior core, except perhaps at the positions of the gates. Heat and pressure are then applied in the molding process to form the two-material sprocket of the invention.

Thus, the invention has been shown in detail with reference to a specific example, but other exemplary versions of the invention are possible. For example, sprockets having other tooth, bore, hub, and peripheral configurations can be made. The material pairings listed in the table provide just some examples of materials that could be used. The skin material and the core material may be molded out of materials having different colors to indicate wear of the skin. So, as these few examples suggest, the invention is not restricted to the particular embodiment described and illustrated, but includes all embodiments and modifications that may fall within the scope of the appended claims.

What is claimed is:

1. A sprocket for a modular plastic conveyor belt, the sprocket comprising:
   an exterior skin made of a first plastic material; and
   an interior core integrally molded with the exterior skin and made of a second plastic material; and
   further comprising peripheral sprocket teeth forming part of the exterior skin and molded entirely of the first plastic material, wherein the interior core is completely encapsulated by the exterior skin.

2. A sprocket as in claim 1 wherein the first plastic material is selected from the group consisting of: polyurethane, polypropylene, acetal, and TEFLON.

3. A sprocket as in claim 1 wherein the first plastic material includes an electrically conductive additive.

4. A sprocket as in claim 1 wherein the second material is selected from the group consisting of: glass-filled polyurethane; glass-filled polypropylene; nylon; foamed polypropylene; reground polypropylene, polyethylene, acetal, or nylon; SANTOPRENE; and a polyurethane and acetal blend.

5. A sprocket as in claim 1 wherein the first and the second plastics are colored differently.

6. A sprocket as in claim 1 wherein the second plastic material is glass-filled.

7. A sprocket as in claim 1 wherein the second plastic material includes reground plastic.

8. A sprocket as in claim 1 wherein the second plastic material is more flexible than the first plastic material.

9. A sprocket as in claim 1 wherein the first plastic material is more flexible than the second plastic material.

10. A sprocket as in claim 1 wherein the sprocket is formed in a co-injection molding process.

11. A sprocket as in claim 1 wherein the exterior skin is no less than about 0.3 mm thick.

12. A sprocket as in claim 1 wherein the first plastic material includes an antimicrobial additive.

13. A sprocket for a modular plastic conveyor belt, the sprocket comprising:
    an exterior skin made of a first plastic material; and
    an interior core integrally molded with the exterior skin and made of a second plastic material;
    wherein the first plastic material includes an antimicrobial additive.

* * * * *